United States Patent [19]

Deslypper

[11] Patent Number: 4,939,587
[45] Date of Patent: Jul. 3, 1990

[54] METHOD FOR READING A RECORDED MOVING SCENE, IN PARTICULAR ON A VIDEODISK, AND APPLICATION OF SAID METHOD TO DRIVING SIMULATORS

[75] Inventor: Christian Deslypper, Jouy le Moutier, France

[73] Assignee: Giravions Dorand, Suresnes, France

[21] Appl. No.: 212,706

[22] Filed: Jun. 28, 1988

[30] Foreign Application Priority Data

Nov. 24, 1986 [FR] France ................... 8616329

[51] Int. Cl.⁵ .............................. G11B 7/00
[52] U.S. Cl. ................... 358/342; 358/104; 364/578; 434/69
[58] Field of Search ............ 358/335, 342, 907, 104; 364/578; 434/69

[56] References Cited

U.S. PATENT DOCUMENTS 4,750,888 6/1988 Allard et al. ............. 434/69
4,752,836 6/1988 Blanton et al. ........... 358/342

Primary Examiner—Robert L. Richardson
Attorney, Agent, or Firm—Fleit, Jacobson, Cohn, Price, Holman & Stern

[57] ABSTRACT

In a method for reading a moving scene previously recorded in the form of successive images, the images are restituted by successive reading frames each corresponding to one image, the frames being intended to follow each other at a predetermined rate corresponding to a nominal speed of displacement of the moving scene. The method essentially consists:

in defining an apparent speed at which the moving scene is required to travel, in automatically determining a function which expresses the ratio of the apparent speed V to the nominal speed Vnom by a number of recorded images to be skipped or to be repeated periodically at the time of reading, and in automatically initiating transfer from one image to another at each reading frame by a program which takes said function into account including a fractional portion of the number of images to be skipped or to be repeated at each reading frame.

8 Claims, 6 Drawing Sheets

1st line
PRIOR ART

2nd line
PRIOR ART

3rd line
PRIOR ART

4th line
PRIOR ART

Fig. 4

| Value of N | Jump table (K = 16) | Images present on the 16 frames |||||||||||||||| 
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| N = 0 | 0000 0000 0000 0000 | M | M | M | M | M | M | M | M | M | M | M | M | M | M | M | M |
| N = 1 | 1000 0000 0000 0000 | M+1 | M | M | M | M | M | M | M | M | M | M | M | M | M | M | M |
| N = 2 | 1000 0000 1000 0000 | M+1 | M | M | M | M | M | M | M | M | M | M | M | M | M | M | M |
| N = 3 | 1000 0100 0010 0000 | M+1 | M | M | M | M | M | M | M | M | M | M | M | M+1 | M | M | M |
| N = 4 | 1000 1000 1000 1000 | M+1 | M | M | M+1 | M | M | M | M | M | M | M | M | M | M | M | M |
| N = 5 | 1001 0010 0100 1000 | M+1 | M | M | M | M+1 | M | M | M | M | M | M | M | M | M | M | M |
| N = 6 | 1001 0010 1001 0010 | M+1 | M | M | M | M | M+1 | M | M | M | M | M | M | M | M | M | M |
| N = 7 | 1010 1010 1010 1000 | M+1 | M | M+1 | M | M | M | M+1 | M | M | M | M | M | M | M | M | M |
| N = 8 | 1010 1010 1010 1010 | M+1 | M | M | M | M | M | M | M+1 | M | M | M | M | M | M | M | M |
| N = 9 | 1010 1010 1010 1010 | M+1 | M | M | M | M | M | M | M | M+1 | M | M+1 | M | M | M | M | M+1 |
| N = 10 | 1010 1011 1010 1011 | M+1 | M | M+1 | M+1 | M+1 | M+1 | M+1 | M+1 | M+1 | M+1 | M+1 | M+1 | M+1 | M+1 | M+1 | M+1 |
| N = 11 | 1010 1011 1010 1011 | M+1 | M | M+1 | M+1 | M+1 | M+1 | M+1 | M+1 | M+1 | M+1 | M+1 | M+1 | M+1 | M+1 | M+1 | M+1 |
| N = 12 | 1011 1011 1011 1011 | M+1 | M | M+1 | M+1 | M+1 | M+1 | M+1 | M+1 | M+1 | M+1 | M+1 | M+1 | M+1 | M+1 | M+1 | M+1 |
| N = 13 | 1011 1011 1011 1111 | M+1 | M | M+1 | M+1 | M+1 | M+1 | M+1 | M+1 | M+1 | M+1 | M+1 | M+1 | M+1 | M+1 | M+1 | M+1 |
| N = 14 | 1011 1111 1011 1111 | M+1 | M | M+1 | M+1 | M+1 | M+1 | M+1 | M+1 | M+1 | M+1 | M+1 | M+1 | M+1 | M+1 | M+1 | M+1 |
| N = 15 | 1011 1111 1111 1111 | M+1 | M | M+1 | M+1 | M+1 | M+1 | M+1 | M+1 | M+1 | M+1 | M+1 | M+1 | M+1 | M+1 | M+1 | M+1 |

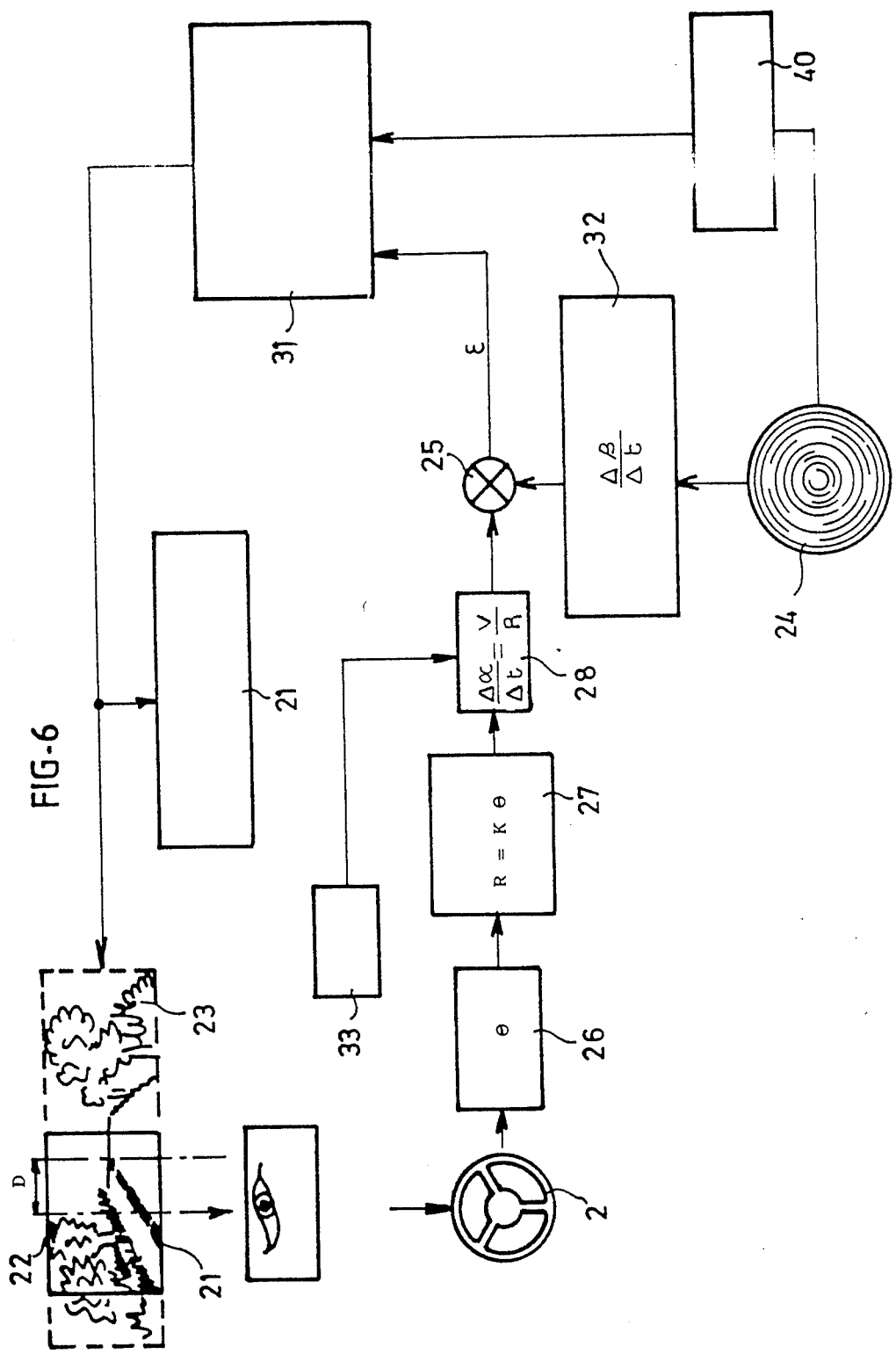

METHOD FOR READING A RECORDED MOVING SCENE, IN PARTICULAR ON A VIDEODISK, AND APPLICATION OF SAID METHOD TO DRIVING SIMULATORS

BACKGROUND OF THE INVENTION

1. Field of the Invention

The present invention relates to the reading of previously recorded images in applications in which the images are restituted by successive reading frames each corresponding to one image, as is more particularly the case with video images.

In an application which is preferred but not considered in any limiting sense, the primary aim of the invention is to utilize the facilities of selection of images of recordings on videodisks for varying the apparent rate of displacement of images at the time of reading. Thus, when reading a moving scene previously recorded on a videodisk, it becomes possible to vary the impression of speed gained by an observer who is viewing the displayed images. For example, a driving simulator can then be controlled by restitution of a landscape which is moving past in front of a driver by controlling the rate of displacement of the landscape as a function of the driving speed simulated by the driver.

2. Description of the Prior Art

Videodisk readers in current use are so designed as to permit selection of the image to be restituted at each reading frame by a periodic process which is capable of skipping or repeating images, for example one image out of two. It is not proposed in this process to utilize this capacity for varying the speed of representation of a moving scene with respect to a nominal speed which corresponds as a rule to a constant reference speed used as a basis for recording. A fortiori, no arrangements are made for permitting a continuous and progressive variation of this speed as is necessary in particular for driving simulators. In point of fact, even assuming that the reader is controlled so as to skip one image out of two, for example, this would lead to no more than a stepwise increase in speed without permitting a progressive and jerk-free variation as contemplated by the invention since it is imperative to ensure that the same time of reading of an image by a video scanning frame is always maintained.

SUMMARY OF THE INVENTION

In order to achieve its object, the invention proposes a method for reading a moving scene previously recorded in the form of successive images in which said images are restituted by successive reading frames each corresponding to one image, said frames being intended to follow each other at a predetermined rate corresponding to a nominal speed of displacement of the moving scene, said method being distinguished by the fact that it consists :
in defining an apparent speed at which said moving scene is required to travel,
in automatically determining a function which expresses the ratio of said apparent speed to said nominal speed by a number of recorded images to be skipped or to be repeated periodically at the time of reading,
and in automatically initiating transfer from one image to another at each reading frame by a program which takes said function into account.

In a preferred embodiment of the method, said function contains a first term expressing a whole number of image jumps at each reading frame and a second term expressing a fractional part of said speed ratio, either added to or subtracted from the first term, by a whole number N of additional images to be skipped or repeated respectively in each successive batch of reading frames comprising a predetermined number K of frames.

In accordance with another distinctive feature of the invention, the program for automatic reading control makes use of a jump table which has previously been stored in memory and distributes the N additional images in each batch of K frames in a balanced manner.

In practice, the predetermined number K will usually be chosen from the numerals 4, 8, 16 or 32 which are well-suited to data-processing in the binary system.

Moreover, it is preferable to ensure that the function provided in the method has a whole number M as a first term. However, the prerecorded table of jumps is already highly useful even if the function is limited to its second term. This applies particularly to slow-motion speeds when M is zero.

The invention also relates to a device for controlling a videodisk reader provided with means which are suited to the practical application of the method in accordance with the invention.

The present invention may in particular involve utilization of a computer program in accordance with an algorithm $V = V_{nom} \times (M + N/K)$, where $V_{nom}$ is the nominal speed and V is the apparent speed at the time of reading. It will be noted that, in the application to restitution of displacement of a moving unit controlled by variation of the apparent speed of displacement of a recorded landscape constituting the moving scene, the nominal speed considered can be either constant or not constant according as the moving unit from which the landscape was recorded was moving at a constant or non-constant speed. Advantageously, the picture-taking rate or shooting speed at the time of recording will be constant and the same will apply to the reading-frame rate at the time of restitution.

Another object of the invention is an application of the method to simulation of driving of a moving unit, not only as a function of the speed but also as a function of an angle of view of the driver and/or of the direction of simulated displacement of the moving unit in the three dimensions.

This object is achieved by the fact that recording of images is carried out in at least two files each corresponding to an angle of view which is different in elevation or to a different sighting magnification and to a series of images of the same panorama recorded at a different angle of view associated with a coded reference of files. This object is also achieved by the fact that selection of images to be reconstituted in front of the viewer is also carried out by means of the coded references of files and of azimuth of their recording as a function respectively of the magnification or of the orientation in elevation and of the orientation in azimuth as determined by sighting control means enabling an observer to determine an angle of view at will.

A final object of the invention is an application to simulation of driving of a moving unit, not only as a function of the speed and/or of the angle of view but also as a function of steering errors controlled by the trainee driver.

This object is achieved by producing on the selected images a displacement with respect to a display window as a function of steering errors of the trainee driver, by comparison between the operations of the steering device controlled by the trainee driver and the model steering operations of the model driver previously recorded either directly on the video disk by suitable coding which utilizes part of the time range reserved for the various service and synchronization signals or externally of the videodisk by means of a memory-stored table of the data-processing means for processing the algorithm.

BRIEF DESCRIPTION OF THE DRAWINGS

FIG. 4 represents the image jump table employed in the algorithm of the method in accordance with the invention.

FIG. 6 represents the application of the method in accordance with the invention to simulation of driving of a vehicle as a function of a steering error.

DETAILED DESCRIPTION OF THE INVENTION

Figure 1:
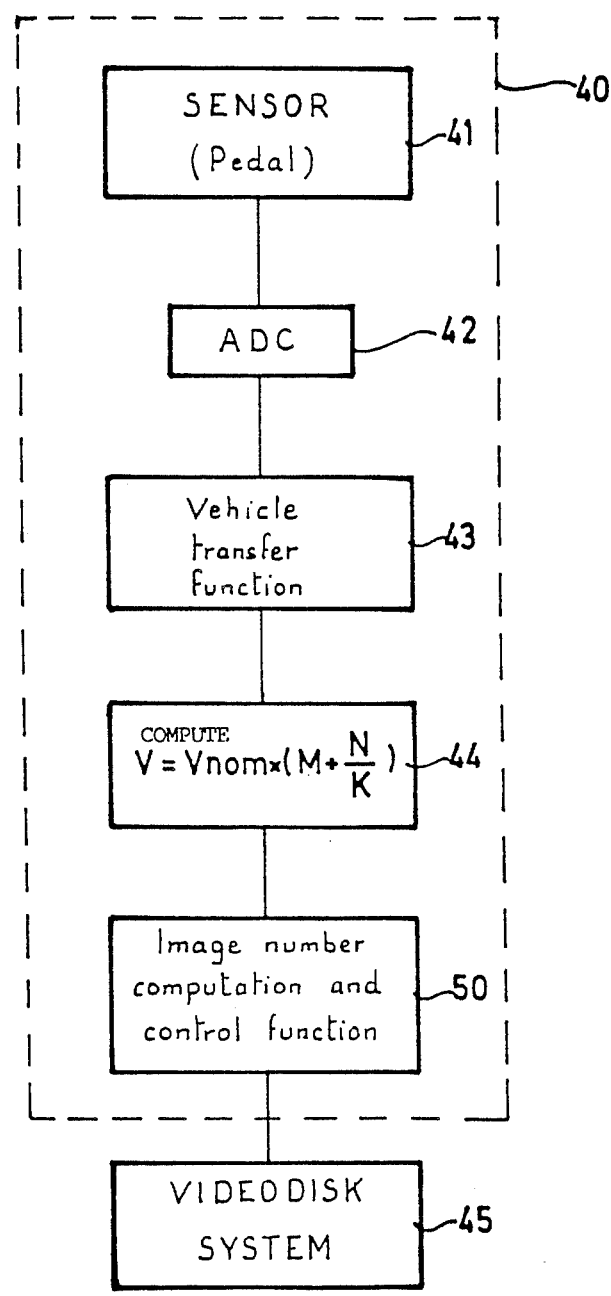
FIG. 1 is a diagram of the means for permitting application of the method to driving simulation.

The flow diagram of a simulator for driving a moving unit as a function of the speed is shown in FIG. 1. The simulator comprises a sensor 41 coupled for example to a pedal which simulates the accelerator pedal of a vehicle. Said sensor delivers an analog signal which is characteristic of the displacement of the pedal to an analog-to-digital converter ADC 42. The output of said analog-to-digital converter ADC 42 is sent to a circuit 43 for simulating the vehicle transfer function which serves to produce a digital signal V representing the speed assigned to the vehicle at each instant. This signal V is translated into the form of a whole number M and of a fractional number N/K as represented in the block 44 which expresses the ratio of the speed V to the normal reading speed of the videodisk and therefore, for the images, to a nominal speed Vnom. This operation, which permits generation of said signal V, is performed by the image-number computation and control function represented by the block 50, this function being performed by the algorithm of the program illustrated in FIG. 2. The result of computation of the image number is applied as a control to a laser-type videodisk reader system 45.

FIG. 3 illustrates the principle of the methods of pickup and restitution of images as employed in videodisks in a conventional manner. The first line of FIG. 3 represents the image pickup carried out from a moving unit which travels at a predetermined speed and by means of a camera which records an image at intervals of 1/25 of a second. In consequence, each image and the following associated image represents a distance increment of x meters. In respect of a constant rate of displacement, all the distance increments are equal. At the time of restitution of images, if the image n changes to the image n+1 at intervals of 1/25 of a second, the observer will see a displacement at the same rate as the recording speed, namely at nominal speed. This is shown in the second line of FIG. 3.

When it is desired to change-over to double the speed for restitution, one image out of two is skipped so as to pass at each video reading frame from the image n to the image n+2. This is shown in line 3 of FIG. 3. When reading the videodisk in conventional methods of utilization, a variation in the apparent speed of displacement is possible only in the direction of slow motion, in which case the apparent speed of displacement thus obtained is an integral submultiple of the nominal speed. For example, when it is desired to reduce the speed by one-half for restitution, one image out of two is skipped during a predetermined time interval. Thus, as shown in the last line of FIG. 3, there is no initial image skipping and reading of the image n is repeated, which is followed by a jump to the image n+1, whereupon there are no image jumps while reading of this image is repeated, this being finally followed by a jump to the next image.

This mode of control of restitution of the recorded images is applicable only insofar as it is necessary in the case of each effective video reading frame either to skip a whole number of recorded images or to re-read the same image a whole number of times. Only a small number of possible speeds is therefore available and any variation in speed can take place only in steps. Furthermore, slow-motion steps are seldom compatible with the rhythm required for normal vision of a continuously moving scene. In practice, the observer will have the sensation of jerky motion. This phenomenon is avoided by making use of the algorithm shown in FIG. 2 and in FIG. 4.

The program 50 for control of numbers of images to be restituted accordingly begins with a stage of reading of the numbers M and N as represented in stage 51, followed by a stage of return to the first frame i=1 as represented in stage 52, where i represents the different numbers of the K frames. This is followed by stage 53 which is a stand-by stage for return of the frame from the videodisk. Once this signal has been received, the next step consists in passing to stage 54 for reading the jump table of FIG. 4 as a function of the value of i, indicating the number of the frame which is being processed, and as a function of the value of N indicating the number of additional images which are to be displayed during the K frames.

In the example of a jump table shown in FIG. 4, the value K has been chosen equal to 16. In stage 54, a check is made to determine whether the value indicated in the jump table is equal to 0 or else is equal to 1. When this value is equal to 0, the procedure passes via the branch 55 to the stage 56 which initiates a forward displacement to the image M. In other words, the procedure remains on the same image for the following reading frame. When the value of the table is equal to 1, the procedure passes via the connection 57 to the stage 58 which initiates a forward displacement to the image M+1. Once the procedure of these two forward displacements 56 or 58 has been performed, the formed on this value i in stage 60 in order to determine whether i is equal to K. In the event that i is equal to K (that is to say 16 in the case of the table of FIG. 4), there has been performed the restitution of images recorded at an accelerated or reduced speed corresponding to the data M and N delivered at the output of the block 43. One then returns to stage 50 via the connection 61 in order to receive fresh instructions. In the event that i is not equal to K" one returns via the connection 62 to the frame return standby stage 53 in order to process the following frame number i.

It is thus apparent from FIG. 4 that, when it is desired to restitute the images at a speed reduced by one-quarter of the nominal speed, this is equivalent to establishing the fact that M is equal to 0 and N is equal to 4. And on the line N=4 in the jump table, it is apparent that the first frame displays the image M +1, the next three frames display the image M, the frame 5 displays the image M+1, the next three frames display the image M, the frame 9 displays the image M+1, the next three frames display the image M, the frame 13 displays the image M+1 and the next three frames display the image M. When consideration is given to the line N=0 of FIG. 4, the situation is such that a fixed image is projected if M is equal to 0. Similarly, if it is desired to restitute the images at an accelerated rate corresponding to two and 7/16 times the nominal speed, the value of M will be equal to 2 and the value of N will be equal to 7. It is then observed that, up to the frame 14, three and two images will be skipped alternately at the time of reading of the videodisk whereas only two images will be skipped in the case of the frames 15 and 16.

In FIG. 4, the jump table numbers and boxes have been respectively underlined and outlined in those instances in which the image number is modified when passing from the upper line to the next lower line or in other words from the value N=1 for example to the value N=2.

Figure 2:
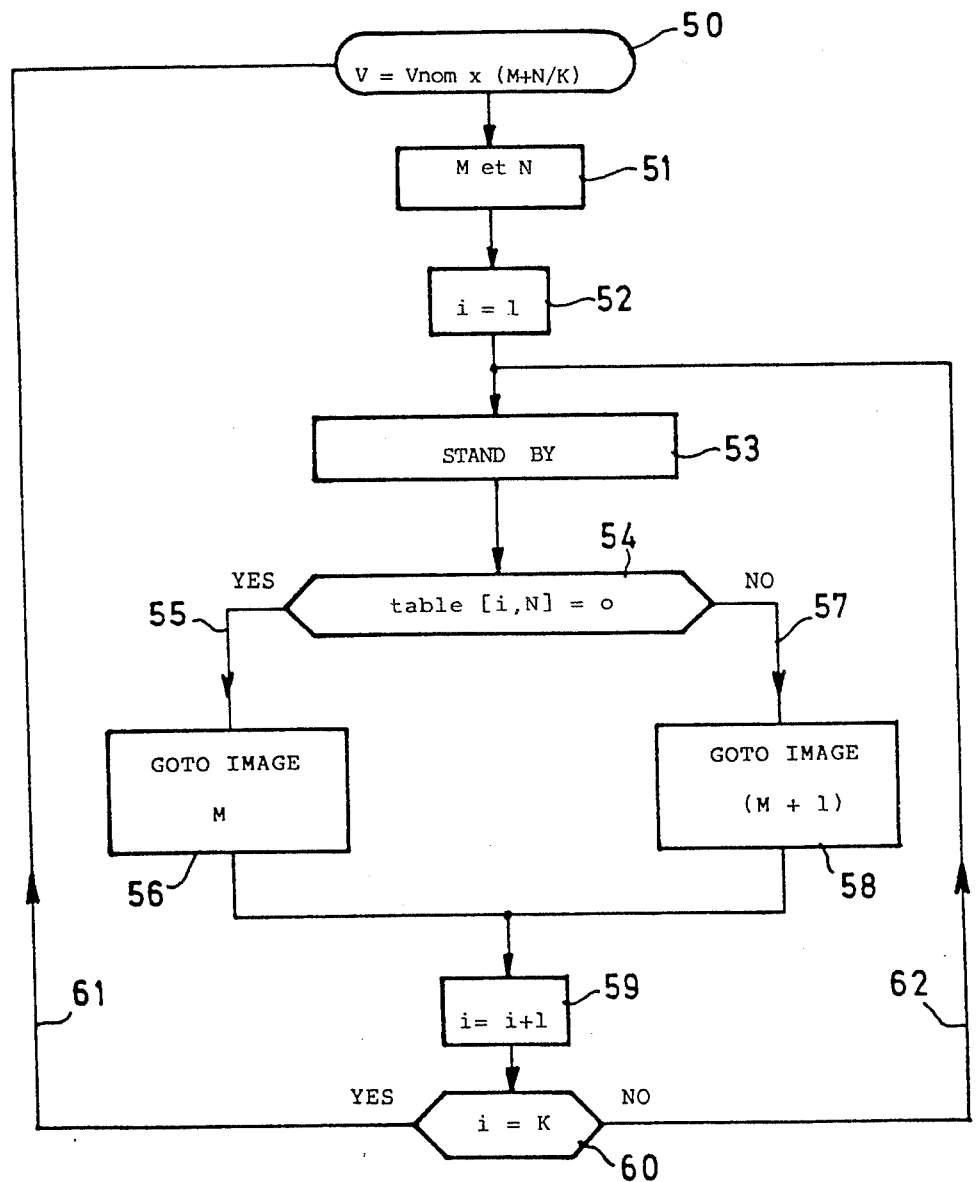
FIG. 2 is a flow diagram of the algorithm which is utilized by the method in accordance with the invention.
Figure 3A:
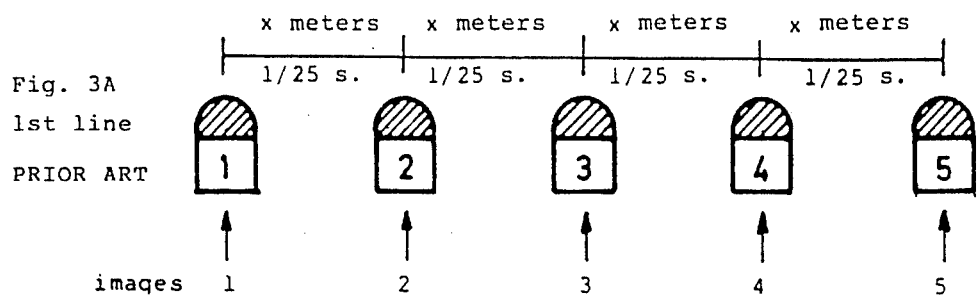
FIGS. 3A–3D are diagrams illustrating the principle of the method in accordance with the prior art.
Figure 3B:
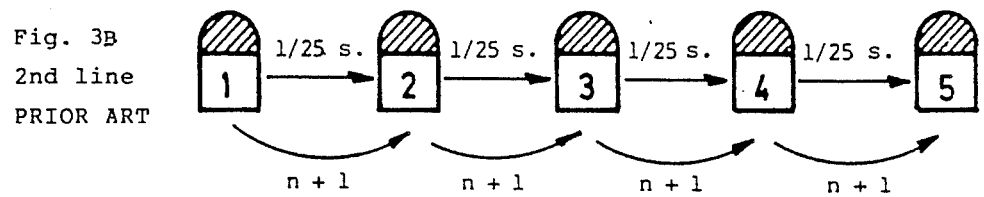
Figure 3C:
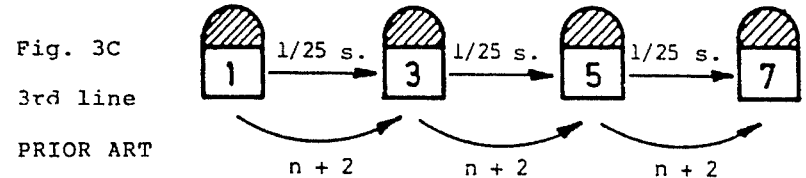
Figure 3D:
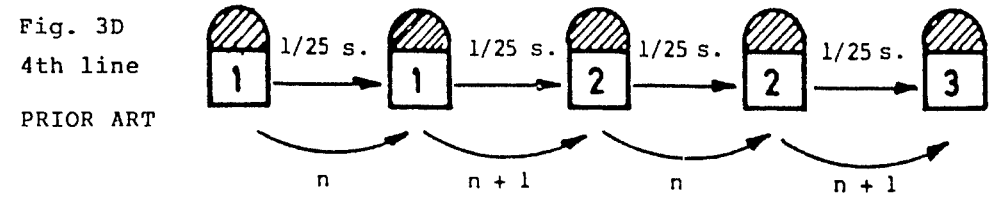

The jump table shown in FIG. 4 is recorded in a memory of the control device of the videodisk reader, this memory being addressed as a function of the numbers M and N (indicating the number of jumps to be effected) and of the number i of the frame being processed, thus making it possible as indicated in the flow chart of FIG. 2 to determine as a function of the value of the bit recorded in the table at this address the forward displacement of M image(s) or the forward displacement of M+1 image(s).

Figure 5:
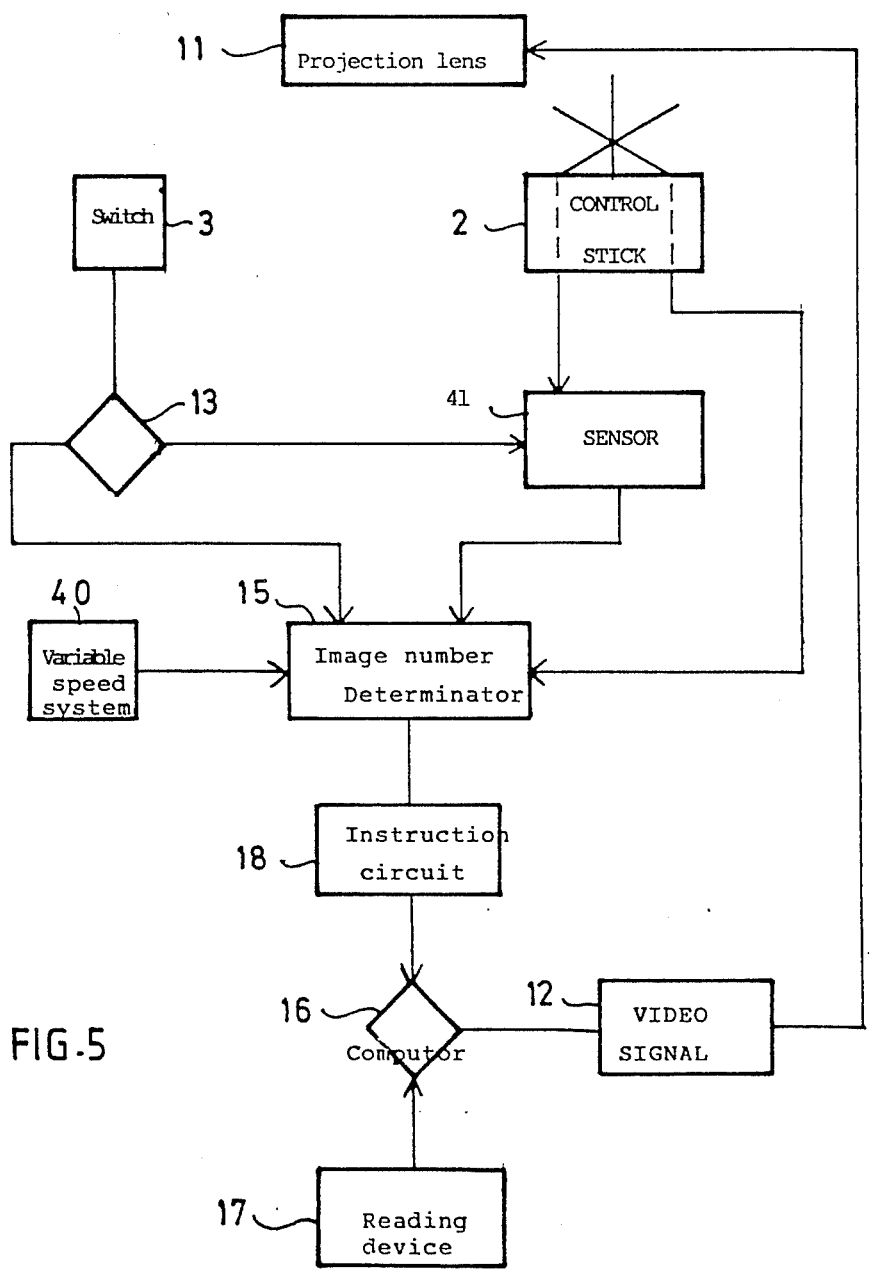
FIG. 5 represents the application of the method in accordance with the invention to simulation of driving of a moving unit as a function of the sighting angle and/or of the direction of simulated displacement.

FIG. 5 illustrates an application of the method and device in accordance with FIGS. 1, 2 and 4 to a device for simulation of driving at a variable speed and sighting angle. A device of this type for simulation of driving at a variable sighting angle is described in detail in French patent Application No. 85 05226 filed on Apr. 5, 1985 in the name of Giravions-Dorand. This device for simulation of driving at a variable sighting angle is combined with the device for simulation of driving at variable speed constituted by the elements shown in block 40 which is connected at the level of the device 15 for determination of the image number. This device 15 for determination of the image number as shown in FIG. 5 will deliver at the output an image number which will be a function both of the azimuth and of the sighting angle but also a function of the speed simulated by the driver. This simulated speed is a function of the image number to be displayed as defined in the K frames by M or by M+1 according to the values of M, N and i. In consequence, the displayed image number will be a function both of the position of the control stick 2, of the position of the magnification switch 3 and of the position of the sensor 41. This image number is employed in an instruction circuit 18 in order to be sent to a comparator 16 which makes it possible by means of a reading device 17 to generate a video signal 12 which is sent to a projection lens 11. As indicated in French patent Application No. 85 05226 by Giravions-Dorand, recording of images is carried out in at least two files each corresponding to a different angle of view in elevation or to a different sighting magnification and to a series of images of the same panorama recorded at a different angle of view associated with a coded file reference. Selection of images to be reconstituted in front of the observer is carried out by the coded references of files and of azimuth of recorded images and the references which are supplied by the magnification or orientation in elevation or in azimuth as determined by the sighting control means 2, 3.

FIG. 6 illustrates an application of the device and a method for simulation of driving of a vehicle as a function of speed to a device for simulation of driving of a vehicle as a function of the steering error controlled by the trainee driver. A device of this type has been disclosed in French patent Application No. 83 20136 filed on Dec. 15, 1983 in the name of Giravions-Dorand. As indicated in this Application, the device generates an error signal $\epsilon$ from a signal $\theta$ which indicates the direction set by the trainee driver and from a signal $\Delta\beta$ over $\Delta t$ previously recorded on the videodisk itself by suitable coding or in a memory which is external to the videodisk and which indicates the model steering control operations performed by the model driver. This signal $\epsilon$ serves in a circuit 31 to produce a shift D of the image displayed in front of the trainee driver who is placed behind his steering-wheel 2. The detection device 26 generates a signal $\theta$ which is converted by a circuit 27 to a signal $R=K\theta$ which is in turn converted in a circuit 28 to a signal $\Delta\alpha/\Delta t=V/R$. This value $\Delta\alpha/\Delta t$ serves in a comparator 25 to generate the signal $\epsilon$ with the signal $\Delta\beta\Delta t$.

This device is combined with the device for simulation of driving as a function of speed by adding the function of selection of the number of the image represented by the block 40 at the output of the video-disk, thereby constituting the video signal. In consequence, the images selected by the circuit 40 will be shifted in the circuit 31 as a function of the steering errors $\epsilon$ of the trainee driver by comparison with the model steering control operations recorded on the video-disk itself or in an external memory.

It will naturally be understood that the invention is not limited in any sense to the particular features specified in the foregoing or to the details of the particular embodiment chosen for the purpose of illustrating the invention. All kinds of alternative arrangements may be made in the particular embodiment which has been described by way of example and in its constituent elements without thereby departing from the scope of the invention. The invention accordingly includes all technical means which are equivalent to those described as well as combinations of such means.

What is claimed is:

1. A method for creating an optical sensation of a moving apparatus speed by reading images representing a moving scene previously recorded at a predetermined nominal speed Vnom in the form of frames in which said images are displayed by reading successive frames each corresponding to one image, said successive frames being read consecutively to follow each other at a predetermined rate corresponding to the nominal speed of displacement of the moving scene, said method comprising the steps of:

simulating an apparent speed V at which said moving scene is required to travel, and representing said apparent speed as a function which expresses the speed ratio of said apparent speed V to said nominal speed Vnom by a number of recorded frames to be skipped or to be repeated periodically at the time of reading;

electronically selecting the images to be read in accordance with said function which contains a first term expressing a whole number M of frame jumps at each reading and a second term expressing a fractional part of said speed ratio, either added to or subtracted from the first term, said fractional part being formed by a whole number N representing the number of times a subsequent frame is to be skipped or repeated in a series of frames comprising a predetermined number K of frames.

2. A method according to claim 3, wherein the predetermined number K is one of the numerals 4, 8, 16 or 32 to facilitate data-processing in the binary system.

3. The method according to claim 1, and further comprising the step of selecting said second term from a jump table which has previously been stored in memory.

4. The method according to claim 3, wherein said step of selecting said second term comprises accessing a matrix indicating whether the second term corresponds to a no-jump or a jump of one image operation in accordance with the number N used for addressing a row of the table and a column addressed by a number representing the number of the frame which is to be displayed in said series of K frames.

5. The method according to claim 1, and further comprising the step of recording said images by a videodisk system.

6. The method according to claim 5, and further comprising the step of simulating the driving of a moving unit as a function of speed by obtaining a reference signal of speed of the moving unit delivered by a sensor and generating a signal in accordance with the relation $V = Vnom \times (M + N/K)$, said signal being employed for selection of the recorded images to be restituted.

7. The method according to claim 6, and further comprising the step of recording the images in at least two files each of which corresponds to an angle of view which is different in elevation or in sighting magnification than a series of images of the same panorama recorded at a different angle of view and associated with a coded file reference and selecting images to be reconstituted in front of the viewer.

8. The method according to claim 6, wherein the step of selecting images is modified so that a displacement with respect to a display window as a function of steering errors of a trainee driver of the simulated moving unit, by comparing the operations of the steering device controlled by the trainee drives and preset steering operations of the model driver previously recorded on the videodisk.

* * * * *